United States Patent
Hamilton, II et al.

(10) Patent No.: US 8,126,817 B2
(45) Date of Patent: Feb. 28, 2012

(54) PRODUCT REPAIR ASSISTANCE USING A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/134,828

(22) Filed: Jun. 6, 2008

(65) Prior Publication Data

US 2009/0306935 A1    Dec. 10, 2009

(51) Int. Cl.
*G06Q 10/00* (2006.01)
*G06F 3/048* (2006.01)
*G06F 3/00* (2006.01)

(52) U.S. Cl. ......... 705/305; 715/706; 715/751; 715/757
(58) Field of Classification Search ................ 705/1, 1.1, 705/305, 500; 715/706, 751, 757
See application file for complete search history.

(56) References Cited

U.S. PATENT DOCUMENTS

| | | | | |
|---|---|---|---|---|
| 6,285,932 B1* | 9/2001 | de Bellefeuille et al. | ........ | 701/33 |
| 6,370,454 B1* | 4/2002 | Moore | ............................ | 701/29 |
| 6,584,414 B1* | 6/2003 | Green et al. | ..................... | 702/33 |
| 6,999,990 B1* | 2/2006 | Sullivan et al. | ............... | 709/205 |
| 7,209,860 B2* | 4/2007 | Trsar et al. | ..................... | 702/183 |
| 2003/0014423 A1* | 1/2003 | Chuah et al. | .................. | 707/102 |
| 2005/0125229 A1* | 6/2005 | Kurzweil | ....................... | 704/270 |
| 2006/0133283 A1* | 6/2006 | Weiner et al. | ................. | 370/241 |
| 2008/0263460 A1* | 10/2008 | Altberg et al. | ................. | 715/757 |

OTHER PUBLICATIONS http://www.onlisareinsradar.com/archieves/second_life_step_by_step/ Lisa Rein, How to teleport friends to your location, Aug. 4, 2007.*
Trevor—teaching and learning innovation conference 2007.*

* cited by examiner

*Primary Examiner* — Jami A Plucinski
*Assistant Examiner* — Sangeeta Bahl
(74) *Attorney, Agent, or Firm* — William E. Schiesser; Hoffman Warnick LLC (57) ABSTRACT

An approach that provides product repair assistance using a virtual universe is described. In one embodiment, there is a method for providing repair assistance for a real-world product in a virtual universe. The method includes receiving diagnostic information relating to the real-world product, ascertaining repair assistance information for the real-world product from the received diagnostic information, and generating a rendition of the real-world product along with the repair assistance information for display to a resident on-line in the virtual universe.

12 Claims, 5 Drawing Sheets

PRODUCT REPAIR ASSISTANCE USING A VIRTUAL UNIVERSE

FIELD OF THE INVENTION

This invention relates generally to virtual universes, and more specifically to providing product repair assistance for real-world products to residents that are on-line in a virtual universe.

BACKGROUND OF THE INVENTION

Virtual universes or virtual worlds are computer-based simulated environments intended for its residents to inhabit and interact via avatars, which are personas or representations of the residents of the virtual universes and generally take the form of two-dimensional or three-dimensional human or fantastical representations of a person's self. These types of virtual universes are now most common in massive multi-player on-line games, such as Second Life which is a trademark of Linden Research in the United States, other countries or both. Avatars in these types of virtual universes, which can number well over a million, have a wide range of business and social experiences. These avatars create, manipulate and buy and sell many aspects of their virtual lives. It is common in some of these virtual universes to exchange millions of US dollars on a monthly basis in support of these virtual experiences. As a result, these virtual universes provide a fertile ground for many business opportunities.

SUMMARY OF THE INVENTION

In one embodiment, there is a method for providing repair assistance for a real-world product using a virtual universe. In this embodiment, the method comprises: receiving diagnostic information relating to the real-world product; ascertaining repair assistance information for the real-world product from the received diagnostic information; and generating a rendition of the real-world product along with the repair assistance information for display to a resident on-line in the virtual universe.

In a second embodiment, there is a computer system that provides repair assistance for a real-world product using a virtual universe. In this embodiment, the system comprises at least one processing unit and memory operably associated with the at least one processing unit. A product repair assistance tool is storable in memory and executable by the at least one processing unit. The tool comprises a repair assistance database containing a plurality of repair assistance information that relates to the real-world product. The tool further comprises a real-world product identification component configured to receive diagnostic information relating to the real-world product and determine a respective product identification from the repair assistance database. A diagnostic component is configured to ascertain repair assistance information from the repair assistance database that is applicable to the received diagnostic information for the real-world product. A real-world product rendering component is configured to generate a rendition of the real-world product along with the repair assistance information for display to a resident on-line in the virtual universe.

In a third embodiment, there is a computer-readable medium storing computer instructions, which when executed, enables a computer system to provide repair assistance for a real-world product using a virtual universe. In this embodiment, the computer instructions comprises obtaining diagnostic information relating to the real-world product; ascertaining repair assistance information for the real-world product from the received diagnostic information; and generating a rendition of the real-world product along with the repair assistance information for display to a resident on-line in the virtual universe.

In a fourth embodiment, there is a method for deploying a product repair assistance tool for use in a computer system that provides repair assistance for a real-world product using a virtual universe. In this embodiment, a computer infrastructure is provided and is operable to receive diagnostic information relating to the real-world product; ascertain repair assistance information for the real-world product from the received diagnostic information; and generate a rendition of the real-world product along with the repair assistance information for display to a resident on-line in the virtual universe.

DETAILED DESCRIPTION OF THE INVENTION

Embodiments of this invention are directed to a technique for providing repair assistance for real-world products using a virtual universe. Repair assistance is provided by using a product repair assistance tool that operates within a virtual universe environment and allows residents that are on-line in the virtual universe to receive assistance on a virtual universe client enabling several different approaches to offering repair assistance for real-world products. A real-world product identification component receives diagnostic information relating to the real-world product from a resident that is on-line in the virtual universe. Examples of the diagnostic information can include a fault code designating a particular fault or incipient fault condition for the real-world product, a product code or a description of the issues that the resident would like addressed. A repair assistance database is available that contains a plurality of repair assistance information that relates to the real-world product. The repair assistance information can include information such as proposed repair solutions for correcting issues raised by the resident, product information on the real-world product, cost information, etc. A diagnostic component ascertains the appropriate repair assistance information to obtain from the repair assistance database and provide to the resident. A real-world product rendering component generates a rendition of the real-world product along with the repair assistance information for display to the resident. The product repair assistance tool is further configured to generate a teleport invitation to the resident that will bring the resident upon acceptance to a virtual service center for obtaining additional repair assistance for the real-world product. In addition, there is an option to notify a service provider to summon a service avatar to the location of the avatar of the resident within the virtual universe to assist in repair of the real-world product.

Figure 1:
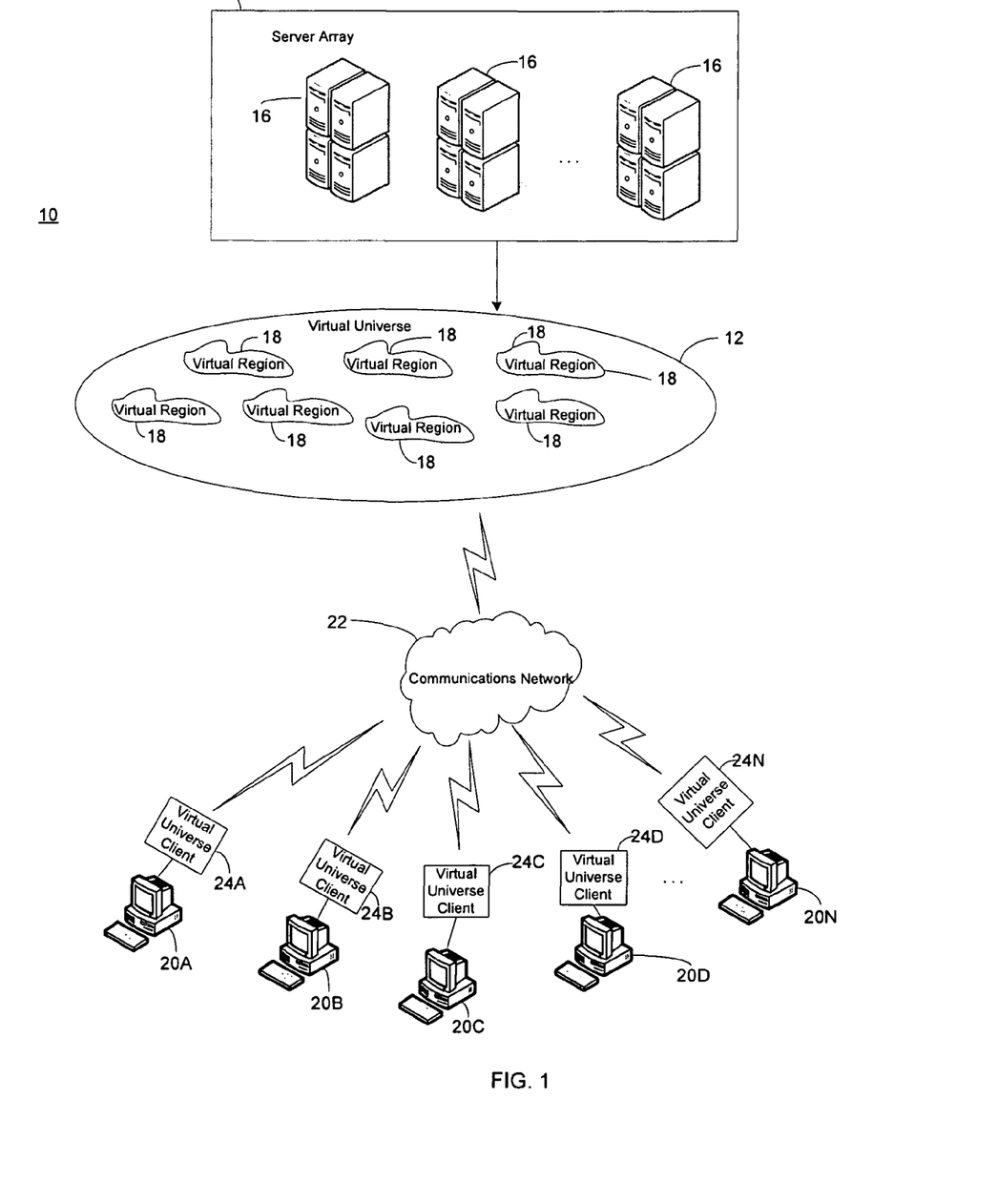
FIG. 1 shows a high-level schematic diagram showing a networking environment for providing a virtual universe according to one embodiment of this invention.

FIG. 1 shows a high-level schematic diagram showing a networking environment 10 for providing a virtual universe 12 according to one embodiment of this invention in which a tool for providing repair assistance of real-world products in a virtual universe can be utilized. As shown in FIG. 1, the networking environment 10 comprises a server array or grid 14 comprising a plurality of servers 16 each responsible for managing a portion of virtual real estate within the virtual universe 12. A virtual universe provided by a typical massive multiplayer on-line game can employ thousands of servers to manage all of the virtual real estate. The content of the virtual real estate that is managed by each of the servers 16 within the server array 14 shows up in the virtual universe 12 as a virtual region 18. Like the real-world, each virtual region 18 within the virtual universe 12 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe. FIG. 1 also shows that users operating computers 20A-20N (hereinafter referred generally as 20) interact with the virtual universe 12 through a communication network 22 via virtual universe clients 24A-24N (hereinafter referred generally as 24) that resides in the computers, respectively. Below are further details of the virtual universe 12, server array 14, and virtual universe client 24.

Figure 2:
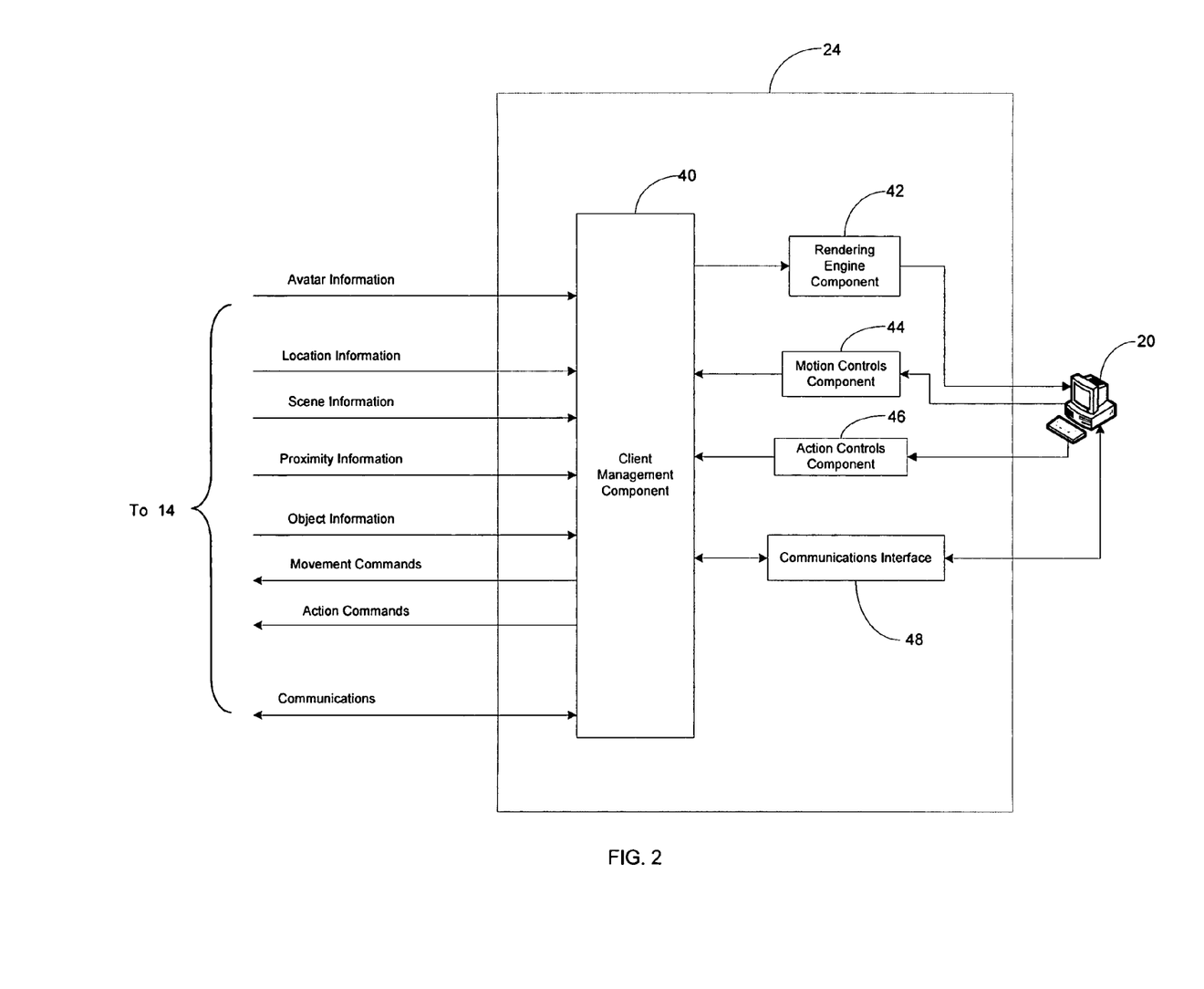
FIG. 2 shows a more detailed view of the virtual universe client shown in FIG. 1.

FIG. 2 shows a more detailed view of the virtual universe client 24 shown in FIG. 1. The virtual universe client 24, which enables users to interact with the virtual universe 12, comprises a client management component 40, which manages actions, movements and communications made by a user through computer 20, and information received from the virtual universe through the server array 14. A rendering engine component 42 enables the user of the computer 20 to visualize his or her avatar within the surroundings of the particular region of the virtual universe 12 that it is presently located. A motion controls component 44 enables the user to make movements through the virtual universe. In one embodiment, movements through the virtual universe can include for example, gestures, postures, walking, running, driving, flying, etc.

An action controls component 46 enables the user to perform actions in the virtual universe such as buying items for his or her avatar or even for their real-life selves, building homes, planting gardens, etc., as well as changing the appearance of their avatar. These actions are only illustrative of some possible actions that a user can perform in the virtual universe and are not limiting of the many possible actions that can be performed. A communications interface 48 enables a user to communicate with other users of the virtual universe 12 through modalities such as chatting, instant messaging, gesturing, talking and email.

FIG. 2 shows various information that may be received by the client management component 40 from the virtual universe through the server array 14. In particular, the client management component 40 receives avatar information about the avatars that are in proximity to the user's avatar. In addition, the client management component 40 receives location information about the area that the user's avatar is near (e.g., what region or island he or she is in) as well as scene information (e.g., what the avatar sees). The client management component 40 also receives proximity information which contains information on what the user's avatar is near and object information which is information that can be obtained by one's senses (e.g., touch, taste, smell, etc.,) and what actions are possible for nearby objects (e.g., postures, movements). FIG. 2 also shows the movement commands and action commands that are generated by the user that are sent to the server array via the client management component 40, as well as the communications that can be sent to the users of other avatars within the virtual universe.

Figure 3:
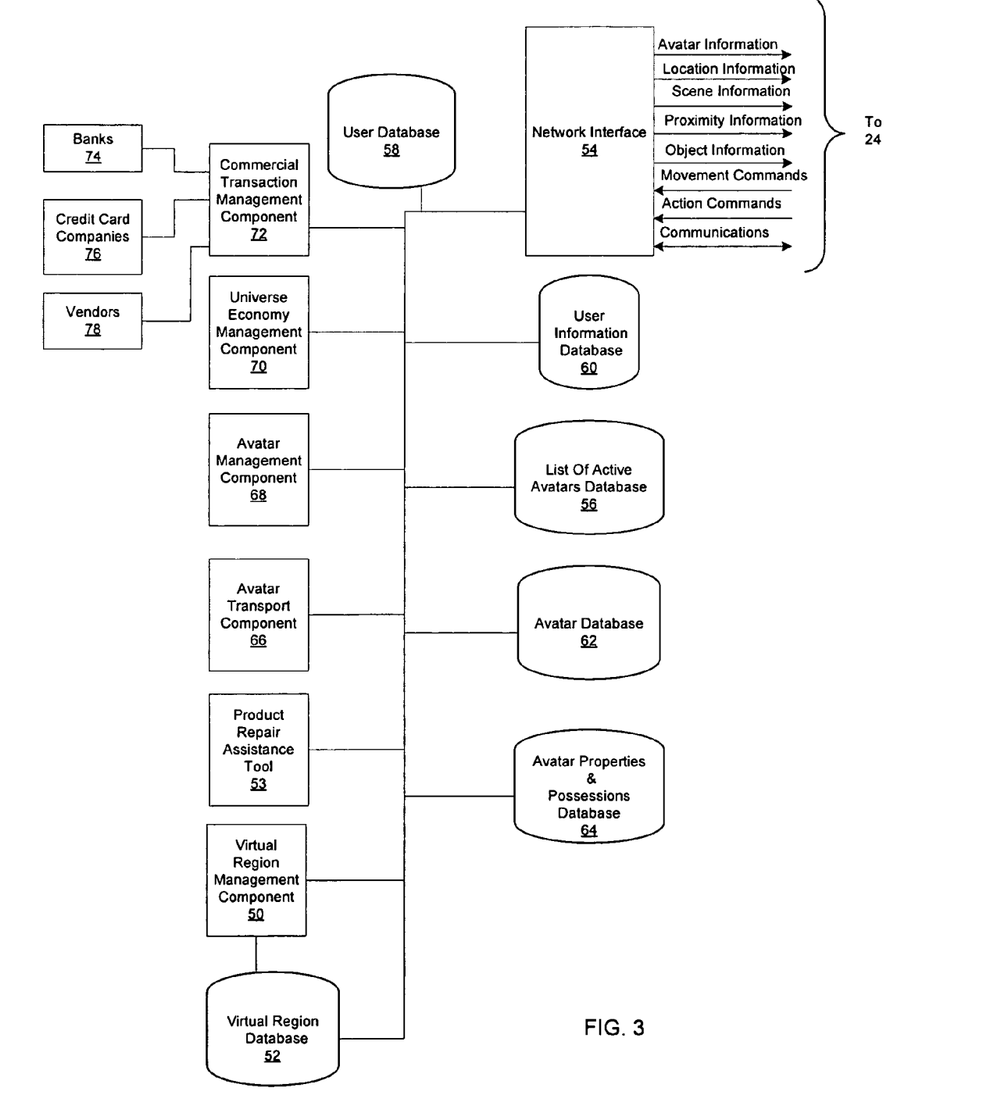
FIG. 3 shows a more detailed view of some the functionalities provided by the server array shown in FIG. 1.

FIG. 3 shows a more detailed view of some the functionalities provided by the server array 14 shown in FIG. 1. In particular, FIG. 3 shows a virtual region management component 50 that manages a virtual region within the virtual universe. In particular, the virtual region management component 50 manages what happens in a particular region such as the type of landscape in that region, the amount of homes, commercial zones, boutiques, streets, parks, restaurants, etc. A virtual region database 52 stores information on all of the items in the virtual region 18 that the virtual region management component 50 is managing. In one embodiment, for very large virtual universes, one server 16 may be responsible for managing one particular virtual region 18 within the universe. In other embodiments, it is possible that one server 16 may be responsible for handling one particular island within the virtual region 18.

A product repair assistance tool 53 allows residents to obtain repair assistance for real-world products through the virtual universe 12. The product repair assistance tool 53 receives diagnostic information relating to the real-world product from a resident that is on-line in the virtual universe 12. The product repair assistance tool 53 ascertains the appropriate repair assistance information to provide to the resident. The repair assistance information can include information such as proposed repair solutions for the real-world product, cost information associated with the proposed repair solutions, service providers, product information, etc. The product repair assistance tool 53 also generates a rendition of the real-world product along with the repair assistance information for display to the resident so that the resident will have a better idea of the components that are likely attributing to any fault conditions. The product repair assistance tool 53 is further configured to generate a teleport invitation to the resident that will bring the resident upon acceptance to a virtual service center for obtaining additional repair assistance for the real-world product. In addition, the product repair assistance tool 53 is configured to notify a service provider to summon a service avatar to the location of the avatar of the resident within the virtual universe to assist in repair of the real-world product. Below is a more detailed discussion of the product repair assistance tool 53 and how it provides repair assistance for real-world products.

FIG. 3 shows a network interface 54 that enables the server array 14 to interact with the virtual universe client 24 residing on computer 20. In particular, the network interface 54 communicates information that includes information pertaining to avatars, location, scene, proximity and objects to the user through the virtual universe client 24 and receives movement and action commands as well as communications from the user via the universe client.

As shown in FIG. 3, there are several different databases for storing information. In particular, database 56 contains a list of all the avatars that are on-line in the virtual universe 12. Databases 58 and 60 contain information on the actual human users (i.e., the residents) of the virtual universe 12. In one embodiment, database 58 contains general information on the users such as names, addresses, interests, ages, etc., while database 60 contains more private information on the users such as email addresses, billing information (e.g., credit card information) for taking part in transactions. Databases 62 and 64 contain information on the avatars of the residents that reside in the virtual universe 12. In one embodiment, database 62 contains information such as all of the avatars that a resident may have, the profile of each avatar, avatar characteristics (e.g., appearance, voice and movement features), while database 64 contains an inventory listing properties and possessions that each avatar owns such as houses, cars, sporting equipment, appearance, attire, etc. Those skilled in the art will recognize that databases 58-64 may contain additional information if desired. Although the above information is shown in FIG. 3 as being stored in databases, those skilled in the art will recognize that other means of storing information can be utilized.

An avatar transport component 66 enables individual avatars to transport, which allows avatars to transport through virtual space from one point to another point, instantaneously. For example, avatars could teleport to an art exhibit held in a museum held in Greenland.

An avatar management component 68 keeps track of what on-line avatars are doing while in the virtual universe. For example, the avatar management component 68 can track where the avatar presently is in the virtual universe, what activities it is performing or has recently performed. An illustrative but non-exhaustive list of activities can include shopping, eating, talking, recreating, etc.

Because a typical virtual universe has a vibrant economy, the server array 14 has functionalities that are configured to manage the economy. In particular, a universe economy management component 70 manages transactions that occur within the virtual universe between avatars. In one embodiment, the virtual universe 12 will have their own currency that users pay for with real-life money. The users can then take part in commercial transactions for their avatars through the universe economy management component 70. In some instances, the user may want to take part in a commercial transaction that benefits him or her and not their avatar. In this case, a commercial transaction management component 72 allows the resident to participate in the transaction. For example, while walking around a commercial zone, an avatar may see a pair of shoes that he or she would like for themselves and not their avatar. In order to fulfill this type of transaction and others similarly related, the commercial transaction management component 72 interacts with banks 74, credit card companies 76 and vendors 78 could be used to facilitate such a transaction.

Although not expressly shown in FIG. 3, all of the components shown in the figure are configured to interact with each other. The components that are shown as being interconnected are illustrated in that manner to convey the close interactions that exist between these components such as the banks 74, credit card companies 76, and vendors with the commercial transaction management component 72.

Figure 4:
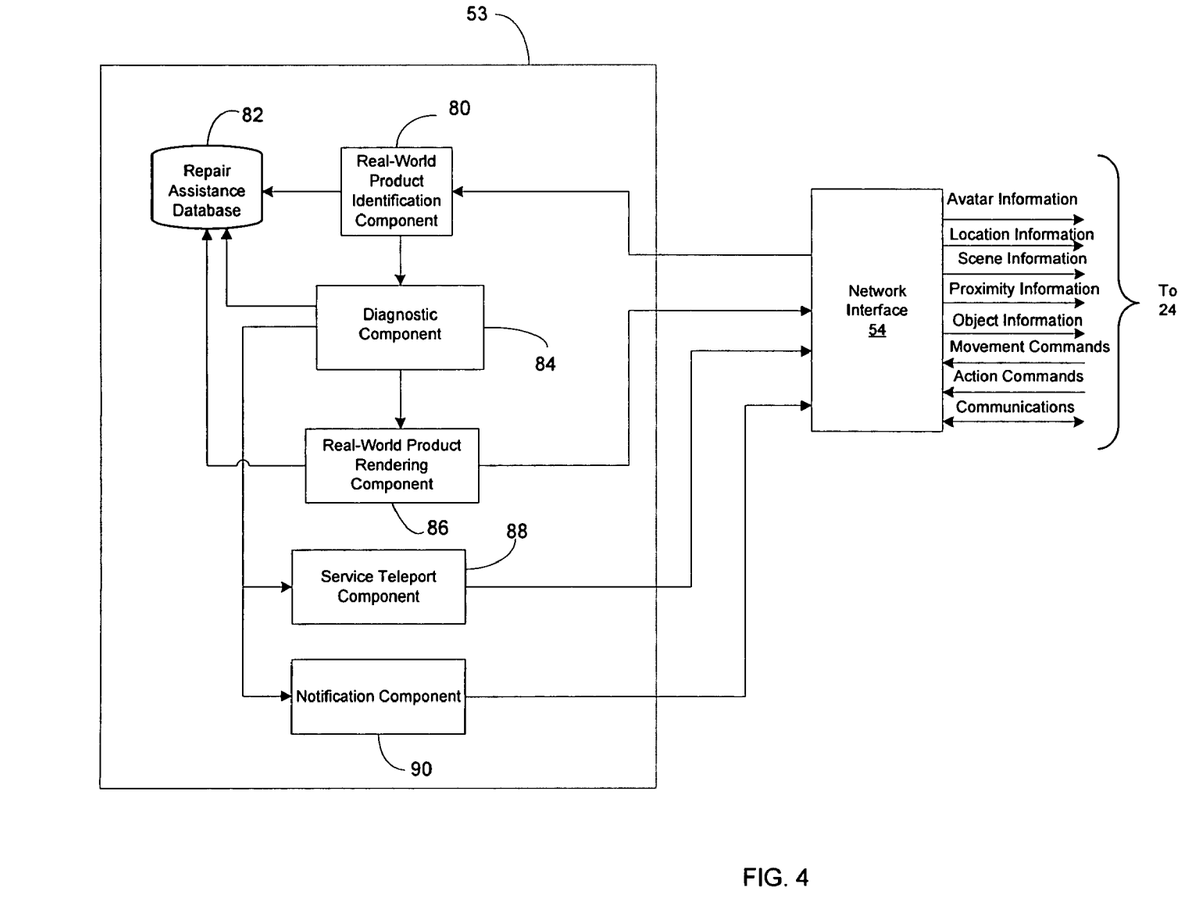
FIG. 4 shows a more detailed view of a product repair assistance tool according to one embodiment that can operate within the virtual universe shown in FIG. 1.

FIG. 4 shows a more detailed view of a product repair assistance tool 53 according to one embodiment that can operate within the virtual universe 12 shown in FIG. 1. As mentioned above, the product repair assistance tool 53 provides assistance for real-world products to residents that are on-line in a virtual universe. In one embodiment, as shown in FIG. 4, the product repair assistance tool 53 is apart of the server array 14 and communicates directly to the virtual universe and its residents via the virtual universe client 24. In other embodiments, the product repair assistance tool 53 might reside on separate computers in direct communication with the virtual universe servers 16 and virtual universe clients 24. In another embodiment, components of the product repair assistance tool 53 might reside on both the server array and virtual universe client.

The product repair assistance tool 53 comprises a real-world product identification component 80 configured to receive diagnostic information relating to a real-world product from a resident that is on-line in the virtual universe 12 interacting through the virtual universe client 24. As used herein, a real-world product may include any product, equipment, system, process or service that is used in the real-world and that may require assistance or maintenance during it lifetime in operation. Examples of real-world products may include computers, medical imaging scanners, aircraft engines, mobile phones, bicycles, etc. Diagnostic information is any information from or concerning a real-life product that can be used in the analysis of symptoms, fault conditions or incipient fault conditions that are associated with the real-world product. Examples of diagnostic information may include fault codes generated from the real-world product, product codes that are associated with the real-world product that are used for identification purposes, and written descriptions of problems or faults that the product is exhibiting or questions that the resident may have concerning the product.

The diagnostic information may be transmitted from the virtual universe client 24 to the real-world product identification component 80 in a variety of ways. In one embodiment, the real-world product can be connected to the computer 20 through a USB connection. The real-world product identification component 80 will then receive diagnostic information such as product codes and any fault codes that the product is experiencing via the virtual universe client 24. In another embodiment, a scanner can be used to scan a bar code or a RFID reader can read an RFID tag placed on the real-world product. The real-world product identification component 80 can then associate this information to a specific product. Additional information such as fault codes and problems can be transmitted to the real-world product identification component 80 via the virtual universe client 24.

Upon receiving the diagnostic information, the real-world product identification component 80 uses a repair assistance database 82 to determine a product identification for the real-world product. The repair assistance database 82 comprises a variety of repair assistance information relating to the servicing of the real-world product. For example, the repair assistance database 82 can store information such as possible faults that are attributable to conditions that may be experienced by the real-world product, the probability indicating the likelihood that each fault is the root cause for a specific condition, recommended repair fixes for overcoming any faults, the costs associated with each of the recommended repair fixes, and a list of possible service providers that can service the real-world product. These examples of repair assistance information is only illustrative and is not exhaustive of all the different types and forms of information that can be stored in the repair assistance database 82 and used for repair assistance of real-world product. For example, the repair assistance database 82 can store real-world product schematics, manuals, exploded views, photographs, etc.

A diagnostic component 84 uses the real-world product identification and ascertains a diagnosis and recommends repair solutions for the real-world product to provide to the resident. In particular, the diagnostic component 84 is configured to map the diagnostic information to a plurality of possible root causes stored in the repair assistance database 82 that associate with the diagnostic information. Accompanying each of the root causes are probabilities listing the likelihood that each cause is responsible for the conditions embodied in the diagnostic information. In addition to root causes, the diagnostic component 84 recommends repair solutions that will fix problems associated with the root causes, costs associated with the recommended solutions, and service providers that can repair the real-world product. In one embodiment, the diagnostic component is an expert system configured to use a well-known artificial intelligence technique such as fuzzy logic, neural networks, etc., to perform the above-noted functions.

A real-world product rendering component 86 generates a rendition of the real-world product along with the repair assistance information determined by the diagnostic component 84. In particular, the real-world product rendering component 86 is configured to obtain schematics, exploded views, photographs, etc., for the real-world product from the repair assistance database 82 and use this information to generate the rendition of the product. In one embodiment, the real-world product rendering component 86 highlights parts or components of the real-world product in the rendition that are believed to be root causes for the diagnostic information. The resident can then interact (e.g., move, zoom, etc.) with the rendition of the real-world product via the virtual universe client 24. This allows greater insight into the product and its components such as an understanding of how to replace a particular part within the product. In addition to the rendition of the real-world product, the world product rendering component 86 can in one embodiment attach the recommended repair solutions, costs, and list of service providers, etc. In still another embodiment, the world product rendering component 86 is configured to place the rendition of the real-world product in an inventory of the resident that is associated with the virtual universe and stored in the server array 14. Those skilled in the art will recognize that this necessitates creating inventory items that can be received and possibly modified upon request.

FIG. 4 shows that the product repair assistance tool 53 further comprises a service teleport component 88 that is configured to generate a teleport invitation to the resident upon a diagnosis made by the diagnostic component. In particular, the teleport invitation generated by the service teleport component 88 will bring the resident (i.e., its avatar) upon acceptance to a virtual service center for obtaining additional repair assistance for the real-world product. For example, it is possible that the manufacturer of the real-world product or a preferred service provider for servicing the real-world product will have a specific island within a virtual region of the virtual universe 12. Therefore, in this island the resident can receive further assistance (e.g., more information, ask additional questions, etc.) in the servicing of the real-world product from the manufacturer or the service provider. For these types of invitations to teleport, those skilled in the art will recognize that this necessitates assigning locations and objects in the virtual universe 12 that when repair assistance is requested for specific products, the service teleport component 88 will teleport the resident to the location of the manufacturer or service provider and render appropriate objects there if not already rendered.

The product repair assistance tool 53 further comprises a service notification component 90 that is configured to notify a service provider that a diagnosis has been made by the diagnostic component 84. In particular, the service notification component 90 sends a signal to the service provider summoning a service avatar to the location of the resident within the virtual universe to assist in the repair of the real-world product. The resident can then watch the service avatar repair the product or replace a component of the product, or ask more questions. In one embodiment, these actions performed by the service avatar can be recorded for later viewing by the resident or used by the service provider to provide to other residents in the virtual universe.

In another embodiment of this invention, the product repair assistance tool 53 is used as a service to charge fees for the repair assistance provided. In this embodiment, the provider of the virtual universe or a third party service provider could offer this product repair assistance tool 53 as a service by performing the functionalities described herein on a subscription and/or fee basis. In this case, the provider of the virtual universe or the third party service provider can create, deploy, maintain, support, etc., the product repair assistance tool 53 that performs the processes described in the invention. In return, the virtual universe or the third party service provider can receive payment from the virtual universe residents via the universe economy management component 70 and the commercial transaction management component 72.

In still another embodiment, the methodologies disclosed herein can be used within a computer system to provide repair assistance for real-world products using a virtual universe. In this case, the product repair assistance tool 53 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 5:
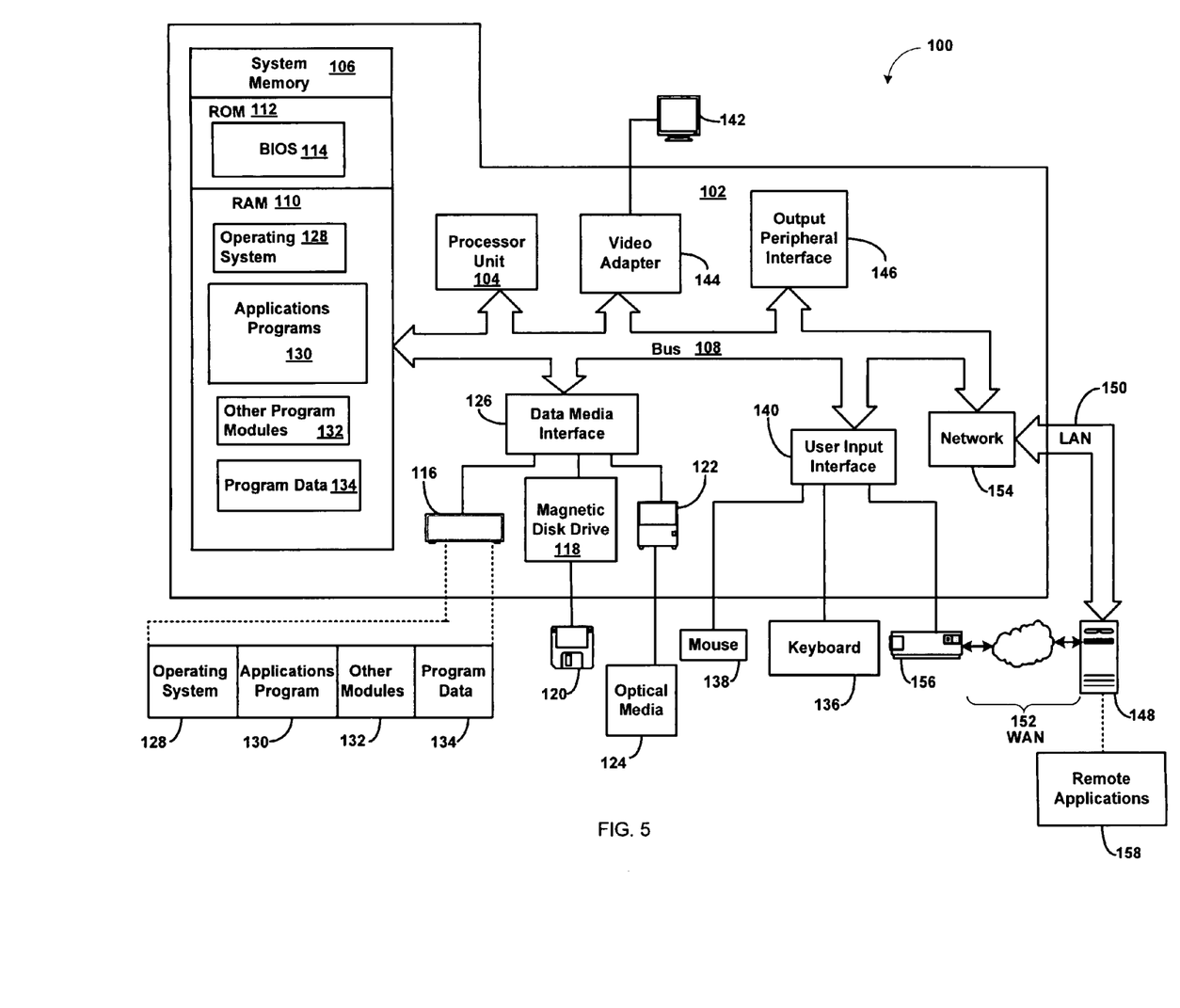
FIG. 5 shows a schematic of an exemplary computing environment in which elements of the networking environment shown in FIG. 1 may operate.

FIG. 5 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 5.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 5, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 5 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including the server array 14, the virtual universe client 24 and the product repair assistance tool 53. In one embodiment, the one or more application programs 130 include components of the product repair assistance tool 53 such as the real-world product identification component 80, repair assistance database 82, diagnostic component 84, real-world rendering product component 86, service teleport component 88, and notification component 90.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 5 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for providing product repair assistance using a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, performed with a computer system, for providing repair assistance for a real-world product using a virtual universe, the method comprising:
using the computer system to perform the following:
receiving diagnostic information relating to the real-world product;
ascertaining repair assistance information for the real-world product from the received diagnostic information, wherein the ascertaining of repair assistance information comprises mapping the diagnostic information to a plurality of root causes that associate with the diagnostic information and a plurality of repair solutions that correct each of the root causes in the real-world product;
generating a rendition of a graphical representation of the real-world product along with the repair assistance information for display to a resident on-line in the virtual universe;
highlighting a part of the real-world product as shown in the graphical representation of the rendition that is the likely cause for the generation of the diagnostic information;
placing the rendition of the graphical representation of the real-world product along with the highlighted part of the real-world product that is the likely cause for the generation of the diagnostic information and the repair assistance information in an inventory of the resident that is associated with the virtual universe for subsequent interaction by the resident to facilitate an understanding of how to repair the real-world product, wherein the inventory contains a listing of properties and possessions in the virtual universe that are associated with the resident;
notifying a service provider to summon a service avatar to the location of the resident in the virtual universe to assist in repair of the real-world product, the resident interacting with the service avatar and watching the service avatar repair the graphical representation of the real-world product in the virtual universe, the repair of the graphical representation of the real-world product being recorded and stored in the inventory of the resident for later viewing by the resident or used by the service provider to provide to other residents in the virtual universe that have real-world products experiencing similar diagnostic information as the resident; and
generating a teleport invitation to the resident that will bring the resident upon acceptance of the invitation to a virtual service center for obtaining additional repair assistance for the real-world product.

2. The method according to claim 1, wherein the receiving of diagnostic information comprises obtaining a real-world product code associated with the real-world product.

3. The method according to claim 1, further comprising attaching a probability to each of the plurality of root causes indicating a likelihood of responsibility for generation of the diagnostic information.

4. The method according to claim 1, further comprising generating a list of costs associated with each of the plurality of repair solutions and a list of service providers to contact for facilitating the repair solutions.

5. The method according to claim 1, further comprising permitting the resident to interact with the rendition of the real-world product in the virtual universe.

6. The method according to claim 1, further comprising charging the resident for the repair assistance provided thereto.

7. A computer system that provides repair assistance for a real-world product using a virtual universe, comprising:
at least one processing unit;
memory operably associated with the at least one processing unit; and
a product repair assistance tool storable in memory and executable by the at least one processing unit, the tool comprising:
a repair assistance database containing a plurality of repair assistance information that relates to the real-world product;
a real-world product identification component configured to receive diagnostic information relating to the real-world product and determine a respective product identification from the repair assistance database;
a diagnostic component configured to ascertain repair assistance information from the repair assistance database that is applicable to the received diagnostic information for the real-world product, wherein the diagnostic component is configured to map the diagnostic information to a plurality of possible root causes stored in the repair assistance database that associate with the diagnostic information;
a real-world product rendering component configured to generate a rendition of a graphical representation of the real-world product along with the repair assistance information for display to a resident on-line in the virtual universe, wherein the real-world product rendering component is configured to highlight a part of the real-world product as shown in the graphical representation of the rendition that is believed to be likely causes for the diagnostic information, wherein the real-world product rendering component is configured to place the rendition of the graphical representation of the real-world product along with the highlighted part of the real-world product that is the likely cause for the generation of the diagnostic information and the repair assistance information in an inventory of the resident that is associated with the virtual universe for subsequent interaction by the resident to facilitate an understanding of how to repair the real-world product, wherein the inventory contains a listing of properties and possessions in the virtual universe that are associated with the resident;
a notification component that is configured to notify a service provider to summon a service avatar to the location of the resident in the virtual universe to assist in repair of the real-world product, the resident interacting with the service avatar and watching the service avatar repair the graphical representation of the real-world product in the virtual universe, the repair of the graphical representation of the real-world product being recorded and stored in the inventory of the resident for later viewing by the resident or used by the service provider to provide to other residents in the virtual universe that have real-world products experiencing similar diagnostic information as the resident; and a service teleport component configured to generate a teleport invitation to the resident that will bring the resident upon acceptance of the invitation to a virtual service center for obtaining additional repair assistance for the real-world product.

8. The system according to claim 7, wherein the real-world product identification component is configured to obtain a real-world product code associated with the real-world product from the resident.

9. A non-transitory computer-readable storage medium storing computer instructions, which when executed, enables a computer system to provide repair assistance for a real-world product using a virtual universe, the computer instructions comprising:

obtaining diagnostic information relating to the real-world product;

ascertaining repair assistance information for the real-world product from the received diagnostic information, wherein the ascertaining of repair assistance information comprises instructions for mapping the diagnostic information to a plurality of root causes that associate with the diagnostic information and a plurality of repair solutions for repairing the real-world product;

generating a rendition of a graphical representation of the real-world product along with the repair assistance information for display to a resident on-line in the virtual universe;

highlighting a part of the real-world product as shown in the graphical representation of the rendition that is the likely cause for the generation of the diagnostic information;

placing the rendition of the graphical representation of the real-world product along with the highlighted part of the real-world product that is the likely cause for the generation of the diagnostic information and the repair assistance information in an inventory of the resident that is associated with the virtual universe for subsequent interaction by the resident to facilitate an understanding of how to repair the real-world product, wherein the inventory contains a listing of properties and possessions in the virtual universe that are associated with the resident;

notifying a service provider to summon a service avatar to the location of the resident in the virtual universe to assist in repair of the real-world product, the resident interacting with the service avatar and watching the service avatar repair the graphical representation of the real-world product in the virtual universe, the repair of the graphical representation of the real-world product being recorded and stored in the inventory of the resident for later viewing by the resident or used by the service provider to provide to other residents in the virtual universe that have real-world products experiencing similar diagnostic information as the resident; and generating a teleport invitation to the resident that will bring the resident upon acceptance of the invitation to a virtual service center for obtaining additional repair assistance for the real-world product.

10. The non-transitory computer-readable medium according to claim 9, further comprising instructions for generating a list of costs associated with each of the plurality of repair solutions and service providers to contact for facilitating the repair solutions.

11. The non-transitory computer-readable medium according to claim 9, further comprising instructions for permitting the resident to interact with the rendition of the graphical representation of the real-world product on-line in the virtual universe.

12. A method for deploying a product repair assistance tool for use in a computer system that provides repair assistance for a real-world product using a virtual universe, comprising:

providing a computer infrastructure, which when executed by the computer system, is operable to:

receive diagnostic information relating to the real-world product;

ascertain repair assistance information for the real-world product from the received diagnostic information, wherein the ascertaining of repair assistance information comprises mapping the diagnostic information to a plurality of root causes that associate with the diagnostic information and a plurality of repair solutions for repairing the real-world product;

generate a rendition of a graphical representation of the real-world product along with the repair assistance information for display to a resident on-line in the virtual universe; highlight a part of the real-world product as shown in the graphical representation of the rendition that is the likely cause for the generation of the diagnostic information;

place the rendition of the graphical representation of the real-world product along with the highlighted part of the real-world product that is the likely cause for the generation of the diagnostic information and the repair assistance information in an inventory of the resident that is associated with the virtual universe for subsequent interaction by the resident to facilitate an understanding of how to repair the real-world product, wherein the inventory contains a listing of properties and possessions in the virtual universe that are associated with the resident;

notify a service provider to summon a service avatar to the location of the resident in the virtual universe to assist in repair of the real-world product, the resident interacting with the service avatar and watching the service avatar repair the graphical representation of the real-world product in the virtual universe, the repair of the graphical representation of the real-world product being recorded and stored in the inventory of the resident for later viewing by the resident or used by the service provider to provide to other residents in the virtual universe that have real-world products experiencing similar diagnostic information as the resident; and generate a teleport invitation to the resident that will bring the resident upon acceptance of the invitation to a virtual service center for obtaining additional repair assistance for the real-world product.

* * * * *